United States Patent Office 3,069,397
Patented Dec. 18, 1962

3,069,397
FLUOROTHIOKETONES AND THEIR POLYMERS
Thomas J. Kealy, Wilmington, Del., assignor to E. I. du Pont de Nemours and Company, Wilmington, Del., a corporation of Delaware
No Drawing. Filed Dec. 18, 1959, Ser. No. 860,326
14 Claims. (Cl. 260—79)

This invention relates to new partially fluorinated thioketones, their polymers, and their preparation.

Fluorine-containing materials have achieved considerable importance in such uses as films, coating compositions, and plastics. Fluorine generally contributes valuable properties, such as inertness, to polymers, especially in the perfluorinated hydrocarbon polymers.

A new and useful class of fluorine- and sulfur- and hydrogen-containing compounds, as well as their polymers, is now provided. More specifically, the following comprise this invention: (A) fluorothioketones of the formula

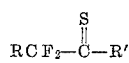

wherein R is hydrogen, halogen, hydrocarbon, or halogenated hydrocarbon and R' is hydrocarbon, (B) polymers of such compounds, and (C) the preparation of the new monomers by thermal decomposition of compounds of the formula

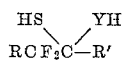

wherein R and R' are as previously specified and Y is oxygen or sulfur (i.e., a group VI–A element of atomic number 8–16). Preferably R and R' have up to 7 carbons each with the halogen being chlorine or fluorine and a total carbon content for the thioketone of generally less than 12 carbons.

The new monomeric thioketones have at least two fluorines on one and only one α-carbon each and have carbon, hydrogen, halogen (including fluorine), and sulfur atoms. They can be represented by the formula

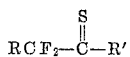

wherein R is hydrogen, halogen, hydrocarbon, or halogenated hydrocarbon and R' is hydrocarbon. In the above formula halogen is chlorine or fluorine (i.e., halogen of atomic number of up to 17) and hydrocarbon is a monovalent radical (i.e., hydrocarbyl) of preferably not more than 7 carbons.

The new partially fluorinated hydrogen-containing thioketones are highly colored, generally blue to purple. They are quite reactive either with themselves to form polymers or with other thiocarbonyl compounds to form copolymers. Low temperatures are necessary to reduce the reactivity of the monomer and maintain them in the monomeric state for any appreciable time. They also react with compounds containing olefinic bonds, e.g., with butadiene (see coassigned application Ser. No. 860,348 filed herewith).

The new compounds of this invention are obtained by thermal decomposition of fluorine-containing gem-dithiols or gem-olthiols, i.e., of the compounds

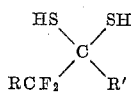

and

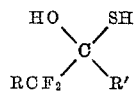

Generically these compounds can be represented by the formula

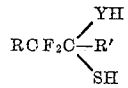

wherein Y represents sulfur to form the dithiol, or oxygen for the hydroxythiol (also called olthiol).

The decomposition of olthiols or dithiols is generally effected at temperatures of above the approximate boiling point of the dithiol or olthiol at atmospheric pressure. The temperature depends on the specific compound employed but is generally above 100° C. and usually above 150° C. The decomposition can be brought about by simply heating a charge of the dithiol or olthiol in a container fitted with suitable means of recovery of the decomposition products or by continuously introducing the organic compound into a heated chamber, e.g., a hot tube containing inert heat transfer material (i.e., packing). The temperature of the latter can be much higher, e.g., 400–750° C., with a relatively short contact time at elevated temperatures.

The products of decomposition are recovered by condensation of the vapor. The desired thioketone having a plurality of fluorines on one α-carbon is separated and purified by conventional methods, especially by distillation.

The α-hydrogen-containing new thioketones sometimes react in a manner indicative of the enol form. Hence, the formula

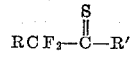

is meant to include the corresponding

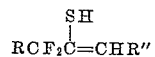

wherein =CHR'' is the radical R' from which a hydrogen atom on the alpha-carbon has been transferred to the sulfur.

The following examples further illustrate the products and process of this invention.

EXAMPLE I

*1,1,1-Trifluorothioacetone Monomer and Polymer From 1,1,1-Trifluoro-2-Mercapto-2-Propanol*

A. 1,1,1-TRIFLUORO-2-MERCAPTO-2-PROPANOL

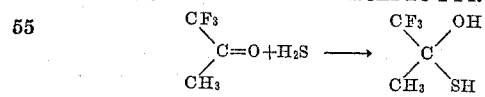

A 1-l. "Hastelloy" bomb was flushed with nitrogen and charged with 56 g. (0.5 mole) of trifluoroacetone and 50 g. of calcium chloride. The bomb was cooled and evacuated and then charged with 100 g. (3 moles) of hydrogen sulfide and 10 g. (0.27 mole) of hydrogen chloride. The reaction was carried out at 80° C. for six hours under autogenous pressure with shaking. After the bomb had been cooled to 0° C., excess hydrogen sulfide was vented. The product was poured into a distilling flask and the calcium chloride was washed several times with ether, and the washings were added to the product. Distillation of this material under reduced pressure afforded, after removal of the ether and any unreacted ketone, approximately 50 g. of the gem-olthiol, M.P. approximately —8° C., B.P. 22–24° C./23 mm.; $n_D^{25}$, 1.3878–1.3890. The infrared spectrum of the gem-olthiol showed strong —OH absorption at 2.8μ and moderate —SH absorption at 3.85μ.

*Analysis.*—Calcd. for $C_3H_5F_3OS$: S, 21.95%. Found: S, 21.28%.

B. DECOMPOSITION OF 1,1,1-TRIFLUORO-2-MERCAPTO-2-PROPANOL

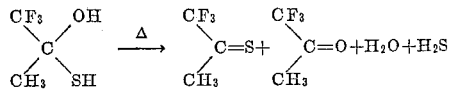

Distillation at atmospheric pressure of a crude product obtained in the above manner afforded a deep purple distillate, B.P. 31–56° C. which was collected in a receiver at —80° C. This distillate was found to be a mixture of trifluorothioacetone and trifluoroacetone, and during the distillation some of the trifluorothioacetone monomer polymerized in the receiver. This polymer was removed by filtration and washed with ether to give a tough, white polymer which was pressed to a clear, self-supporting film at 120° C. This film did not break after repeated flexing. The polymer softened at 45° C. and decomposed at about 170° C. Analysis of this polymer showed it to be polytrifluorothioacetone.

*Analysis.*—Calcd. for $(C_3H_3F_3S)_x$: S, 25.00%. Found: S. 24.14%.

When the purple distillate was allowed to warm to room temperature, the color faded as the trifluorothioacetone polymerized.

Treatment of purple distillates, obtained in the same manner, with 2,3-dimethylbutadiene caused the instantaneous discharge of the purple color with the formation of a 1:1 trifluorothioacetone/2,3-dimethylbutadiene adduct, obtained as a colorless oil, B.P. 99° C./34 mm.; $n_D^{25}$, 1.4533.

*Analysis.*—Calcd. for $C_9H_{13}F_3S$: C, 51.49%; H, 6.23%; F, 27.10%; S, 15.25%. Found: C. 51.14%; H, 6.53%; F, 27.00%; S. 15.75%.

EXAMPLE II

*1,1,1-Trifluorothioacetone From 1,1,1-Trifluoro-2,2-Dimercaptopropane*

A. 1,1,1-TRIFLUORO-2,2-DIMERCAPTOPROPANE

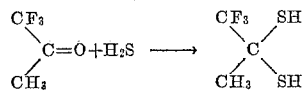

In a manner similar to that of part A of Example I, a 1-l. "Hastelloy" bomb was charged with 112 g. (1 mole) of trifluoroacetone, 100 g. (3 moles) of hydrogen sulfide, 10 g. (0.27 mole) of hydrogen chloride, and 50 g. (0.35 mole) of phosphorus pentoxide. The reaction mixture was maintained at 80° C. for 16 hours with shaking and then cooled to 0° C. and the excess hydrogen sulfide was vented. The crude product contained two layers. The upper layer was decanted and distilled at atmospheric pressure. The distillate was redistilled to obtain the gem-dithiol as the main fraction, 54 g., B.P. 101.5–104° C. (mostly 101.5–102° C.), M.P. 45–47° C. An additional 26 g. of less pure, semisolid dithiol was also obtained, B.P. 92–101.5° C. and 104–108° C.

*Analysis.*—Calcd. for $C_3H_5F_3S_2$: C. 22.20%; H, 3.11%; F, 35.15%; S, 39.50%. Found: C, 20.74%; H, 3.26%.

Repetition of the above general procedure gave a further sample of gem-dithiol which gave the analytical values: F, 35.87%; S, 38.78%.

B. DECOMPOSITION OF 1,1,1-TRIFLUORO-2,2-DIMERCAPTOPROPANE

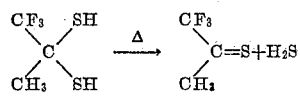

The pyrolysis was carried out in a quartz tube (approximately 17 x 1 inch), packed with cut quartz tubing (6 mm. x 6 mm.), and heated over a length of 12 inches by an external heater. Molten dithiol was added dropwise to the pyrolysis tube which was maintained at 550° C. at a pressure of less than 1 mm. and the monomeric thioketone and hydrogen sulfide were collected in a trap maintained at —196° C. When the first trap was maintained at —80° C. it was necessary to have a second trap at —196° C. in order to condense all of the product. The monomer could be distilled from trap to trap under high vacuum and could be separated from hydrogen sulfide, at least to some extent, by warming the trap to —80° C. and condensing out the more volatile hydrogen sulfide into a trap maintained at —196° C. However, handling of the monomer even at these low temperatures invariably resulted in its partial polymerization.

EXAMPLE III

*1,1,2,2-Tetrafluoro-3-Pentanethione*

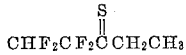

A. PREPARATION OF 1,1,2,2-TETRAFLUORO-3-PENTANONE

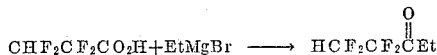

This ketone was prepared by the general method of Dishart and Levine, J. Am. Chem. Soc., 78, 2268 (1956), by the reaction of tetrafluoroproprionic acid with ethyl magnesium bromide in butyl ether; yield 36%, B.P. 85–86° C.; $n_D^{25}$, 1.3264.

*Analysis.*—Calcd. for $C_5H_6F_4O$: F, 48.1%. Found: F, 48.15%.

B. PREPARATION OF 1,1,2,2-TETRAFLUORO-3,3-DIMERCAPTOPENTANE

A 100-ml. "Hastelloy" bomb was charged with 15.8 g. (0.1 mole) of the ketone, 10.2 g. (0.3 mole) of hydrogen sulfide, 1.0 g. of hydrogen chloride, and 5 g. (0.035 mole) of phosphorus pentoxide in a manner similar to that used in Example II. The temperature was maintained at 80° C. while the bomb was agitated over a period of 16 hours. The bomb was cooled to 0° C. and vented. The product was rinsed out of the bomb with ether and the ether was removed by distillation to a pot temperature of 100° C. Distillation at reduced pressure afforded 5.5 g. (26% yield) of crude gem-dithiol (1,1,2,2-tetrafluoro-3,3-dimercaptopentane), B.P. 65° C./20 mm.; $n_D^{25}$, 1.4441; and 6.9 g. of a more volatile product, which was contained in the cold trap, and comprised mostly of 1,1,2,2,-tetrafluoro-3-mercapto-3-pentene

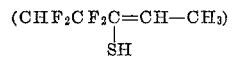

B.P. 120° C.; $n_D^{25}$, 1.3981, identified by elemental, infrared, and n-m-r analysis.

An analytical sample of gem-dithiol (B.P. 84° C./45 mm.; $n_D^{25}$, 1.4430) gave the analytical values:

*Analysis.*—Calcd. for $C_5H_8F_4S_2$: F, 36.50%; S, 30.80%. Found: 37.11%; S, 31.02%.

The mercaptopentene gave the values:

*Analysis.*—Calcd. for $C_5H_6F_4S$: F, 43.60%; S. 18.40%. Found: F, 42.76%; S, 18.39%.

When the preceding general process was repeated except that the temperature was 50° C., a lower yield of the dithiol was obtained.

C. PREPARATION OF 1,1,2,2-TETRAFLUORO-3-PENTANETHIONE

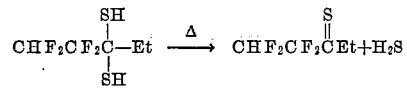

The pyrolysis was carried out in apparatus as described in Example II–B.

The dithiol (3.8 g.) was added dropwise over a period of ½ hour to the pyrolysis tube at a temperature of 550° C. and a pressure of 1 mm. or less. The monomer was collected as a magenta-colored oil in a U-trap maintained at —80° C. and the hydrogen sulfide was collected in a trap at —196 C. The monomer was then distilled at low temperature into a trap containing 3 ml. of dimethylbutadiene at —196° C. The trap containing the monomer and the dimethylbutadiene was then warmed to —80° C. and the reactants were mixed by shaking. On warming the reaction mixture slightly above this temperature, the magenta color was discharged as a rapid reaction occurred. Distillation afforded 1 g. of pure 1:1 tetrafluorothiopentanone/2,3-dimethylbutadiene adduct; B.P. 107.5–108.5° C./8 mm.; $n_D^{26}$, 1.4612.

*Analysis.*—Calcd. for $C_{11}H_{16}F_4S$: F, 29.61%; S, 12.51%. Found: F, 29.79%; S, 13.21%.

D. POLYMERIZATION

A solution of the monomer in $CF_2Cl_2$ was irradiated, with UV light (2537 A.) over a 16-hour period, in a quartz tube connected to a condenser cooled to —80° C. to maintain the reaction temperature near reflux (—30° C.). A red oil, $n_D^{26}$ 1.4296, was obtained whose infrared spectrum established that the material was a dimer or low polymer. Some solid polymer was obtained when a dilute ether solution of the monomer at —80° C. containing some quaternary methoxide as a catalyst was warmed above —80° C.

EXAMPLE IV

*Trifluorothioacetophenone (Trifluoromethyl Phenyl Thioketone)*

A. PREPARATION OF 1,1-DIMERCAPTO-2,2,2-TRIFLUOROPHENYLETHANE

A 300-ml. capacity "Hastelloy" bomb was charged with 17.4 g. (0.1 mole) of trifluoroacetophenone, 34 g. (1 mole) of hydrogen sulfide, 1 g. of hydrogen chloride, and 6 g. (0.042 mole) of phosphorus pentoxide and heated at 80° C. for 16 hours with agitation. The product was washed out of the bomb with ether. Removal of the ether by distillation to a pot temperature of 75° C. afforded an oil which contained white crystals. The oil was siphoned off and the crystals collected by filtration and washed with petroleum ether to obtain 1.5 g. of dimer, $(CF_3CS\phi)_2$. The dimer was crystallized for analysis from ether, M.P. 178.5–179.5° C.

*Analysis.*—Calcd. for $C_{16}H_{10}F_6S_2$: F, 29.95%; S, 16.87%; M.W.; 380. Found: F, 30.03%; S, 16.95%; M.W., 382, 395 (ebullioscopic in ethylene chloride).

Distillation of the oil afforded 2.7 g. of unreacted ketone, 4.1 g. of crude gem-dithiol (21% yield), B.P. 64–68° C./ca. 1 mm.; $n_D^{27}$, 1.5300; and a residue of 3.9 g. which contained solid material.

In another experiment 58 g. (0.333 mole) of trifluoroacetophenone, 48 g. (1.4 mole) of hydrogen sulfide, 22 g. (0.155 mole) of phosphorus pentoxide and 3 g. of hydrogen chloride were heated at 80° C. for 16 hours in a 300-ml. "Hastelloy" bomb. The product was rinsed out of the bomb with ether and distilled to obtain 23 g. of unreacted ketone and 8.7 g. of crude gem-dithiol. Towards the end of the distillation of gem-dithiol the pot contents partially solidified. The resdue was filtered to obtain 5.8 g. of dimer. The filtrate and crude dithiol were combined and distilled to obtain 5.9 g. (13% yield) of pure 1,1-dimercapto-2,2,2-trifluorophenylethane, B.P. 62–63° C./0.6 mm.; $n_D^{26}$, 1.5326.

*Analysis.*—Calcd. for $C_8H_7S_2$: F, 25.41%; S, 28.60%. Found: F, 26.25%; S, 29.02%.

B. PREPARATION OF TRIFLUOROTHIOACETOPHENONE

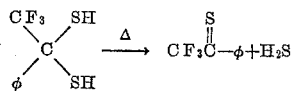

The pyrolysis of the gem-dithiol was carried out as in Example III. Dithiol (3.3 g.) was added dropwise over a period of ½ hour to a pyrolysis tube heated to 550° C. at a pressure of less than 1 mm. The monomer was collected as a blue solid in a U-trap at —80° C. while the hydrogen sulfide was collected in a trap at —196° C. For characterization 2,3-dimethylbutadiene was distilled into the trap containing the monomer and the trap was allowed to warm above —80° C. causing the reactants to melt and, on shaking, the materials reacted as they mixed with the discharge of the blue color. The product was distilled under vacuum and the crude adduct was combined with another sample obtained in a similar manner and redistilled to obtain an analytical sample, B.P. 96° C./0.5 mm.; $n_D^{26}$, 1.5242.

*Analysis.*—Calcd. for $C_{14}H_{15}F_3S$: F, 20.90% S, 11.78%. Found: F, 21.06%; S, 12.05%.

The monomer was also prepared by pyrolysis of the crystalline dimer at 600° C. and a pressure near 1 mm. using a gentle nitrogen stream to reduce sublimation of the dimer back out of the tube.

C. POLYMERIZATION OF TRIFLUOROTHIOACETOPHENONE

On warming to room temperature the monomer formed the crystaline dimer. In one experiment, a small amount of solid polymer formed during a trap-to-trap distillation of the monomer. The polymer softened at about 100° C. with the development of a blue color. (The dimer melted at 178° C. without turning blue.) In the presence of a quaternary methoxide in ether, the monomer did not polymerize at —80° C. or below, but on warming the solution to room temperature, the blue color was slowly discharged and a small amount of amorphous-looking solid separated. Evaporation of the ether gave a grease and some yellow oil.

A solution of trifluorothioacetophenone in dichlorodifluoromethane (B.P. —30° C.) was irradiated in a quartz tube attached to a "Dry-Ice" condenser using a mercury resonance lamp (2537 A.) over a 16-hour period. Evaporation of the solvent gave a viscous, soluble oil. There was some solid on the sides of the tube which softened near 100° C. and turned blue. There was also some brown film on the side of the reaction tube indicating some decomposition had occurred.

The following new fluorine-containing thioketones are included in this invention (along with polymers, i.e., compositions containing recurring units thereof):

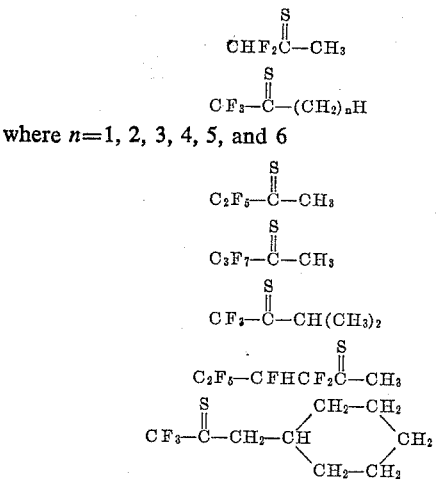

where $n = 1, 2, 3, 4, 5,$ and $6$

The above thioketones are obtained by treatment of the corresponding ketones as described in the examples. The ketones themselves are shown by Lovelace et al., "Aliphatic Fluorine Compounds," Reinhold, New York (1958), pages 190–3. The thioketones of this invention have the general formula $$RCF_2\overset{S}{\overset{\|}{C}}-R'$$

where R is hydrogen, halogen, hydrocarbon, or halogenated hydrocarbon, particularly of lower alkyl (i.e., up to 4 carbons), and R' is hydrocarbon, including aliphatic, alicyclic, and aromatic, preferably of up to 7 carbons.

The gem-dithiols or the olthiols used in the general process for the preparation of the thioketones are obtained by reaction of hydrogen sulfide with the ketone which has at least two fluorines on one α-carbon and an aliphatically saturated hydrocarbon group (i.e., hydrocarbon free from aliphatic unsaturation) on the other α carbon. This reaction is effected at temperatures of above room temperature, preferably 50–125° C., and under pressure (to provide sufficiently high concentration of hydrogen sulfide at elevated temperatures). The reaction can be carried out in the presence of added acid but such is not necessary. When a dehydrating agent, such as phosphorus pentoxide, is present, the gem-dithiol is formed; whereas, in its absence the olthiol is generally the primary product.

The reaction is generally conducted under anhydrous conditions. Inert solvents can be employed; however, they are unnecessary. The temperature should be between 50–100° C., since optimum yields of the desired products are obtained in this range. The time is usually from a few hours to a day for the reaction to be completed. In the reaction hydrogen sulfide is preferably employed in considerable excess over the theoretical.

The new thioketones of this invention are converted spontaneously to compositions containing recurring units of the monomer. The higher molecular weight materials are dimers and linear high polymers. Monomers having a lower carbon content polymerize more rapidly to higher molecular weight products than the thioketones having 5–10 carbons; the latter giving mostly dimers and liquid polymers. Polymers of the new fluorine-containing thioketones are also obtainable directly in the preparation of the monomers. Generally isolation of the monomers results in depolymerization of some dimer and other lower molecular weight polymers that may be present.

Useful polymeric materials containing recurring monomer units are also obtained when mixtures of the monomers of this invention and other polymerizable carbonyl and thiocarbonyl compounds are subjected to polymerization conditions. For example, copolymers are formed with hexafluorothioacetone. Polymers and copolymers of the lower molecular weight products of this invention are generally solid and melt above 50° C. Such polymers can be pressed into flexible films useful for wrappings protective against moisture and corrosive vapors or molded to form shaped objects useful for containers for corrosive liquids or closures for vessels. The liquid polymers of the higher thioketones are useful as hydraulic fluids.

Since obvious modifications and equivalents in the invention will be evident to those skilled in the chemical arts, I propose to be bound solely by the appended claims.

The embodiments of the invention in which an exclusive property or privilege is claimed are defined as follows:

1. A thioketone of the formula $$R-CF_2-\overset{S}{\overset{\|}{C}}-R'$$

wherein R is selected from the group consisting of hydrogen, halogen, and hydrocarbon and halogenated hydrocarbon having up to 7 carbons and R' is a hydrocarbon having up to 7 carbons, all halogen in said thioketone having an atomic number no greater than 17.
2. 1,1,1-trifluorothioacetone.
3. 1,1,2,2-tetrafluoro-3-pentanethione.
4. Trifluorothioacetophenone.
5. A polymer of a compound of claim 1.
6. A polymer of 1,1,1-trifluorothioacetone.
7. A polymer of 1,1,1-trifluorothioacetone in the form of a self-supporting film.
8. A polymer of 1,1,2,2-tetrafluoro-3-pentanethione.
9. A polymer of trifluorothioacetophenone.
10. The process of preparing a thioketone of claim 1 which comprises thermally decomposing a compound of the formula $$RCF_2\overset{YH}{\underset{SH}{\overset{|}{C}}}-R'$$

wherein R and R' are as defined in claim 1 and Y is a chalcogen of atomic number less than 17.
11. The process of preparing 1,1,1-trifluorothioacetone which comprises thermally decomposing 1,1,1-trifluoro-2-mercapto-2-propanol.
12. The process of preparing 1,1,1-trifluorothioacetone which comprises thermally decomposing 1,1,1-trifluoro-2, 2-dimercaptopropane.
13. The process of preparing 1,1,2,2-tetrafluoro-3-pentanethione which comprises thermally decomposing 1,1,2,2-tetrafluoro-3,3-dimercaptopentane.
14. The process of preparing trifluorothioacetophenone which comprises thermally decomposing 1,1-dimercapto-2,2,2-trifluorophenylethane.

References Cited in the file of this patent

UNITED STATES PATENTS 2,437,985    Winkler et al. _____ Mar. 16, 1948
3,012,995    Middleton _____ Dec. 12, 1961

OTHER REFERENCES

Chemical Society Journal, London, 1955, pp. 3871–80.